United States Patent
Tidwell et al.

(10) Patent No.: US 10,356,078 B2
(45) Date of Patent: Jul. 16, 2019

(54) WEB TICKET BASED UPON A SYMMETRIC KEY USABLE FOR USER AUTHENTICATION

(71) Applicant: Microsoft Technology Licensing, LLC, Redmond, WA (US)

(72) Inventors: Paul Tidwell, Sammammish, WA (US); Yves Pitsch, Mercer Island, WA (US); Deepak Rao, Issaquah, WA (US); Vadim Eydelman, Bellevue, WA (US); Satya Kondepudi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/947,705

(22) Filed: Apr. 6, 2018

(65) Prior Publication Data

US 2018/0227291 A1 Aug. 9, 2018

Related U.S. Application Data

(63) Continuation of application No. 13/925,854, filed on Jun. 25, 2013, now Pat. No. 9,954,843.

(Continued)

(51) Int. Cl.
*H04L 29/06* (2006.01)
*H04L 9/32* (2006.01)
(Continued)

(52) U.S. Cl.
CPC ........ *H04L 63/0807* (2013.01); *G06F 21/335* (2013.01); *G06F 21/57* (2013.01);
(Continued)

(58) Field of Classification Search
CPC ...... G06F 21/335; G06F 21/57; G06F 21/629; H04L 63/0807; H04L 65/40; H04L 67/02;
(Continued)

(56) References Cited

U.S. PATENT DOCUMENTS

| 6,065,117 A | 5/2000 | White |
| 6,263,432 B1 | 7/2001 | Sasmazel et al. |

(Continued)

FOREIGN PATENT DOCUMENTS

| CN | 101926127 A | 12/2010 |
| CN | 102047708 A | 5/2011 |

(Continued)

OTHER PUBLICATIONS

Lee, Joong-Hee, Jong-Hyouk Lee, and Tai-Myoung Chung. "Ticket-based authentication mechanism for proxy mobile IPv6 environment." The Third International Conference on Systems and Networks Communications. IEEE, 2008. (Year: 2008).*

(Continued)

*Primary Examiner* — Michael Simitoski
(74) *Attorney, Agent, or Firm* — Medley, Behrens & Lewis, LLC

(57) ABSTRACT

Described herein are various aspects pertaining to generating web tickets for use with authenticating computing devices to a computing system. Symmetric keys are used when generating the web tickets, wherein a symmetric key is valid for use when generating web tickets for a first period of time, and a web ticket generated based upon the symmetric key is valid for use when authenticating a computing device for a second period of time that is longer than the first period of time. Thus, the symmetric key is used for authenticating computing devices after it has ceased being used to generate web tickets.

20 Claims, 9 Drawing Sheets

Related U.S. Application Data

(60) Provisional application No. 61/771,073, filed on Feb. 28, 2013.

(51) Int. Cl.

| | | |
|---|---|---|
| *H04L 29/08* | (2006.01) | |
| *G06F 21/33* | (2013.01) | |
| *G06F 21/57* | (2013.01) | |
| *G06F 21/62* | (2013.01) | |
| *G06F 7/04* | (2006.01) | |

(52) U.S. Cl.
CPC .......... *G06F 21/629* (2013.01); *H04L 65/40* (2013.01); *H04L 67/02* (2013.01); *H04L 67/10* (2013.01); *H04L 67/1095* (2013.01); *H04L 67/2814* (2013.01); *H04L 67/327* (2013.01)

(58) Field of Classification Search
CPC . H04L 67/10; H04L 67/1095; H04L 67/2814; H04L 67/327
See application file for complete search history.

(56) References Cited

U.S. PATENT DOCUMENTS

| | | |
|---|---|---|
| 6,405,216 B1 | 6/2002 | Minnaert et al. |
| 6,421,768 B1 | 7/2002 | Purpura |
| 6,678,733 B1 * | 1/2004 | Brown ............... H04L 63/0209 709/203 |
| 7,010,600 B1 | 3/2006 | Prasad et al. |
| 7,055,032 B2 | 5/2006 | Sandhu et al. |
| 7,137,006 B1 | 11/2006 | Grandcolas et al. |
| 7,188,181 B1 * | 3/2007 | Squier ............... G06F 21/41 709/228 |
| 7,818,792 B2 | 10/2010 | Shamsaasef et al. |
| 8,069,435 B1 * | 11/2011 | Lai ............... G06Q 10/10 717/106 |
| 8,095,972 B1 | 1/2012 | Floyd et al. |
| 8,195,626 B1 | 6/2012 | Goodwin |
| 8,225,385 B2 | 7/2012 | Chow et al. |
| 8,527,631 B1 | 9/2013 | Liang |
| 8,856,869 B1 | 10/2014 | Brinskelle |
| 9,397,861 B1 | 7/2016 | Tovino et al. |
| 2002/0078144 A1 | 6/2002 | Lamkin et al. |
| 2002/0112155 A1 | 8/2002 | Martherus et al. |
| 2002/0126846 A1 * | 9/2002 | Multerer ............... A63F 13/12 380/251 |
| 2002/0138728 A1 | 9/2002 | Parfenov et al. |
| 2002/0146132 A1 * | 10/2002 | Medvinsky ............ H04L 9/0822 380/279 |
| 2002/0150253 A1 | 10/2002 | Brezak et al. |
| 2002/0169961 A1 | 11/2002 | Giles et al. |
| 2003/0033535 A1 | 2/2003 | Fisher et al. |
| 2003/0037237 A1 | 2/2003 | Abgrall et al. |
| 2003/0051157 A1 * | 3/2003 | Nguyen ............... H04L 63/04 726/4 |
| 2003/0217288 A1 | 11/2003 | Guo et al. |
| 2004/0061719 A1 | 4/2004 | Barsness et al. |
| 2004/0098609 A1 * | 5/2004 | Bracewell ............ H04L 63/068 726/6 |
| 2004/0156491 A1 | 8/2004 | Reding et al. |
| 2004/0210633 A1 * | 10/2004 | Brown ............... H04L 12/1845 709/203 |
| 2005/0216773 A1 * | 9/2005 | Mitchell ............... H04L 9/083 726/5 |
| 2006/0095526 A1 | 5/2006 | Levergood et al. |
| 2006/0101114 A1 | 5/2006 | Sandhu et al. |
| 2006/0174110 A1 | 8/2006 | Strom et al. |
| 2006/0277596 A1 | 12/2006 | Calvert et al. |
| 2007/0067398 A1 | 3/2007 | Karmarkar |
| 2007/0073625 A1 | 3/2007 | Shelton |
| 2007/0118886 A1 | 5/2007 | Martin |
| 2007/0156842 A1 | 7/2007 | Vermeulen et al. |
| 2009/0064303 A1 * | 3/2009 | Dickinson ............... G06Q 10/06 726/10 |
| 2010/0002686 A1 | 1/2010 | Rosenberg et al. |
| 2010/0011431 A1 * | 1/2010 | Cynkin ............... G06F 21/6218 726/9 |
| 2010/0128598 A1 | 5/2010 | Gandhewar et al. |
| 2010/0131639 A1 | 5/2010 | Narayana et al. |
| 2010/0306547 A1 | 12/2010 | Fallows et al. |
| 2010/0319063 A1 | 12/2010 | Koppolu et al. |
| 2011/0154222 A1 | 6/2011 | Srinivasan et al. |
| 2011/0231921 A1 * | 9/2011 | Narayanan ............ G06F 21/335 726/9 |
| 2011/0307541 A1 * | 12/2011 | Walsh ............... H04L 67/1034 709/203 |
| 2012/0227094 A1 * | 9/2012 | Begen ............... G06F 21/41 726/4 |
| 2012/0284804 A1 | 11/2012 | Lindquist et al. |
| 2012/0297460 A1 * | 11/2012 | Brown ............... H04L 12/1845 726/4 |
| 2013/0007150 A1 | 1/2013 | Hertz et al. |
| 2013/0054694 A1 | 2/2013 | Maeng et al. |
| 2013/0086381 A1 * | 4/2013 | Thomas ............... H04L 9/3234 713/168 |
| 2013/0097687 A1 | 4/2013 | Storm |
| 2013/0117768 A1 | 5/2013 | Gheorghe et al. |
| 2014/0019626 A1 * | 1/2014 | Hubler ............... H04L 65/1006 709/227 |
| 2014/0032902 A1 * | 1/2014 | Agrawal ............ H04L 63/0428 713/168 |

FOREIGN PATENT DOCUMENTS

| | | |
|---|---|---|
| CN | 102077550 A | 5/2011 |
| CN | 102196035 A | 9/2011 |
| CN | 102812665 A | 12/2012 |
| CN | 102904619 A | 1/2013 |

OTHER PUBLICATIONS

Wu, Bing, et al. "Secure and efficient key management in mobile ad hoc networks." Parallel and Distributed Processing Symposium, 2005. Proceedings. 19th IEEE International. IEEE, 2005. (Year: 2005).*

"Public Mashery/iodocs", Retrieved at <<https://github.com/mashery/iodocs>>, Retrieved Date: Mar. 13, 2013, p. 11.

"Document your API with Style", Retrieved at <<https://developers.helloreverb.com/swagger/>>, Retrieved Date: Mar. 13, 2013, pp. 1-4.

Stokes, Luke, "Hypermedia Dog Food", Retrieved at <<http://www.foxycart.com/blog/hypermedia-dog-food#.UUFNoNZmiSp>> Jan. 24, 2013, pp. 1-4.

Duvall, Paul, "Automation for the People: Pushbutton Documentation", Retrieved at <<http://www.ibm.com/developerworks/library/j-ap06108/index.html>> Jun. 10, 2008, pp. 1-10.

Verborgh, et al., "Functional Descriptions as the Bridge Between Hypermedia APIs and The Semantic Web", Retrieved at <<http://ws-rest.org/2012/proc/a5-9-verborgh.pdf>>, In Proceedings of the Third International Workshop on RESTful Design, Apr. 17, 2012, pp. 1-8.

Gruenbaum, Peter, "Automated Documentation for REST APIs", Retrieved at <<http://blog.programmableweb.com/2012/03/28/automated-documentation-for-rest-apis/>> Mar. 28, 2012, pp. 1-8.

"Visualize Code Dependencies on Dependency Graphs", Retrieved at <<http://msdn.microsoft.com/en-us/library/dd409453.aspx#Graphitems>> Retrieved Date: Mar. 18, 2013, pp. 1-26.

"Graphviz—Graph Visualization Software", Retrieved at <<http://graphviz.org/>> Retrieved Date: Mar. 18, 2013, pp. 1-3.

"Data-Driven Documents", Retrieved at <<http://d3js.org/>> Retrieved Date: Mar. 18, 2013, pp. 1-3.

"Arborjs", Retrieved at <<http://arborjs.org/>> Retrieved Date: Mar. 18, 2013, p. 1.

"Thinkmap", Retrieved at <<http://www.thinkmap.com/pressrelease.jsp?id=1306>> Retrieved Date: Mar. 18, 2013, pp. 1-3.

(56) References Cited

OTHER PUBLICATIONS

Johncla., "Lync Developer Roundtable: UCWA Overview", Retrieved at <<https://channel9.msdn.com/posts/Lync-Developer-Roundtable-UCWA-Overview>> Aug. 14, 2012, p. 1.
"International Search Report & Written Opinion for PCT Patent Application No. PCT/US2014/018465", dated Jun. 4, 2014, Filed Date: Feb. 26, 2014, 10 Pages.
"Office Action Issued in European Patent Application No. 14711354.2", dated May 3, 2017, 4 Pages.
"International Preliminary Report on Patentability for PCT Patent Application No. PCT/US2014/018463", dated Apr. 16, 2015, 7 pages.
"Office Action Issued in European Patent Application No. 14711354.2", dated Oct. 10, 2017, 5 Pages.
"First Office Action and Search Report Issued in Chinese Patent Application No. 201480011317.3", dated Sep. 30, 2017, 18 Pages.
Microsoft, Lync 2010 Integration. http://technet.microsoft.com/en-us/library/gg398806(v=ocs.14).aspx. 2012.
"Non-Final Office Action for U.S. Appl. No. 13/925,854", dated Nov. 7, 2014, 19 pages.
Rebahi, et al., "Performance Analysis of Identity Management in the Session Initiation Protocol (SIP)", In IEEE, 2008, pp. 711-717.
"Response to the Non-Final Office Action for U.S. Appl. No. 13/925,854", filed Apr. 16, 2015, 27 pages.
"Non-Final Office Action for U.S. Appl. No. 13/925,854", dated Jun. 24, 2015, 12 pages.
Lin, et al., "Single Sign-On for Unified Communications", In International Journal of Intelligent Computing Research (IJICR), vol. 3, Issues 1-2, Mar. 2012, pp. 269-276.
Menezes, et al., Handbook of Applied Cryptography, 1997 CRC Press, LLC, pp. 321-383.
"Response to the Non-Final Office Action for U.S. Appl. No. 13/925,854", filed Dec. 16, 2015, 12 pages.
"Final Office Action for U.S. Appl. No. 13/925,854", dated Jan. 22, 2016, 14 pages.
"Response to the Final Office Action for U.S. Appl. No. 13/925,854", filed Jun. 22, 2016, 10 pages.
"Non-Final Office Action for U.S. Appl. No. 13/925,854", dated Jul. 27, 2016, 15 pages.
"Response to the Non-Final Office Action for U.S. Appl. No. 13/925,854", filed Jan. 25, 2017, 14 pages.
"Final Office Action for U.S. Appl. No. 13/925,854", dated Mar. 23, 2017, 17 pages.
"Response to the Final Office Action for U.S. Appl. No. 13/925,854", filed Sep. 23, 2017, 10 pages.
"Notice of Allowance for U.S. Appl. No. 13/925,854", dated Dec. 14, 2017, 9 pages.
"Corrected Notice of Allowability for U.S. Appl. No. 13/925,854", dated Jan. 16, 2018, 6 pages.

\* cited by examiner

WEB TICKET BASED UPON A SYMMETRIC KEY USABLE FOR USER AUTHENTICATION

RELATED APPLICATIONS

This application is a continuation of U.S. patent application Ser. No. 13/925,854, filed on Jun. 25, 2013, and entitled "WEB TICKET BASED UPON A SYMMETRIC KEY USABLE FOR USER AUTHENTICATION", which claims priority to U.S. Provisional Patent Application No. 61/771,073, filed on Feb. 28, 2013, and entitled "UNIFIED COMMUNICATIONS TECHNOLOGIES". The entireties of these applications are incorporated herein by reference.

BACKGROUND

Conventional unified communications (UC) applications support multiple communications modalities including, but not limited to, voice communications (e.g., through integration with a telephone system), voicemail retention and management, video conferencing, meeting scheduling, meeting maintenance, desktop sharing, instant messaging, contacts management (e.g. maintaining a list of contacts of a user of the UC application), presence (e.g. monitoring availability of users of the UC application), group maintenance (e.g., retaining information that identifies groups of the user of the UC application), amongst other communications modalities. The UC application is typically a distributed application, with front-end software executing on client computing devices and back-end software executing on server computing devices, wherein the client computing devices are in network communication with the server computing devices.

Relatively recently, UC applications have been configured to execute on mobile computing devices, such as, mobile telephones, tablets (slates), and the like. The increased use of mobile computing devices, and therefore, the increased use of front-end UC software executing on mobile computing devices, has raised issues not previously associated with UC applications. For example, a data plan corresponding to a mobile telephone may limit an amount of data that can be uploaded and/or downloaded by the mobile computing device (without the user incurring fees that are in addition to monthly plan fees). Further, when using the UC application on a mobile computing device, a user typically causes such application to be executed in foreground for a relatively small amount of time, and subsequently causes the UC application to execute in the background. For instance, the user may participate in a relatively brief meeting through utilization of the UC application executing on the mobile telephone, and thereafter place the telephone in a pocket or bag. In contrast, users of the UC application executing on a desktop computing device tend to allow the application to continuously execute in the foreground.

Conventional tokens utilized to authenticate a user of a UC application tend to be relatively large, such as on the order of 4 kilobytes. If the UC application is configured to cause the user to transmit the token with every request made to servers executing back-end software of the UC application, the relatively large payload of such request (caused at least partially by the relatively large token) can cause the application to execute sub-optimally, and further may result in additional fees being charged to the user for exceeding a data plan. Further, conventional back-end software of UC applications are configured to retain session identifiers for each UC client deemed as being active, wherein the UC client is typically deemed as being active for at least several hours after communicating with a server used in the UC application. Retaining numerous session identifiers limits the scalability of the UC application, in that resources are reserved to maintain session identifiers. Further, with respect to portable computing devices, maintaining session identifiers for long periods of time is wasteful since, as mentioned above, UC application users who log in using mobile computing devices typically do not remain active on the UC application.

SUMMARY

The following is a brief summary of subject matter that is described in greater detail herein. This summary is not intended to be limiting as to the scope of the claims.

Described herein are various technologies pertaining to creation and use of web tickets in connection with authenticating computing devices, wherein the web tickets are of a relatively small size (e.g., 200 bytes or less), and wherein the web tickets are based upon symmetric keys. In an exemplary embodiment, a first computing device can request a first web ticket from a computing system that generates web tickets and authenticates computing devices based upon web tickets. The computing system, responsive to receiving the request, can generate the first web ticket through use of a first symmetric key. The first symmetric key has a first expiration time assigned thereto, after which the computing system ceases to use the first symmetric key when generating web tickets. The first web ticket has a second expiration time assigned thereto, which is subsequent the first expiration time. Thus, the first computing device can use the first web ticket to authenticate to the computing system after the computing system ceases using the symmetric key when generating web tickets.

Subsequent to the first expiration time, a second computing device can request a second web ticket from the computing system. The computing system, responsive to receiving such request, generate the second web ticket through use of a second symmetric key. The second symmetric key has a third expiration time assigned thereto, which is subsequent the first expiration time. Additionally, the second web ticket has a fourth expiration time assigned thereto, which is subsequent the second expiration time and the third expiration time. Further, the third expiration time may be prior to the second expiration time, such that there is a window of time in which both the first web ticket and the second web ticket are valid. Moreover, during this window of time, it is possible that the computing system does not use either of these keys when generating new web tickets.

A list of symmetric keys used to generate web tickets can be maintained. For instance, the first symmetric key used to generate the first web ticket can be maintained for eight hours in a list of keys. In an example, computing system can generate web tickets that expire after eight hours, and the computing system can use a symmetric key for one hour when creating web tickets. Therefore, the computing system can maintain a list of symmetric keys, wherein the list includes a current symmetric key used to generate web tickets and another eight most recent symmetric keys used to generate web tickets.

When, for example, the first computing device wishes to authenticate with the computing system, the first computing device transmits the first web ticket to the computing system. The computing system identifies the first symmetric key (based upon content of the first web ticket), and determines that the first symmetric key is identified in the list. The computing system then authenticates the first computing device based upon the first web ticket and the first symmetric key.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
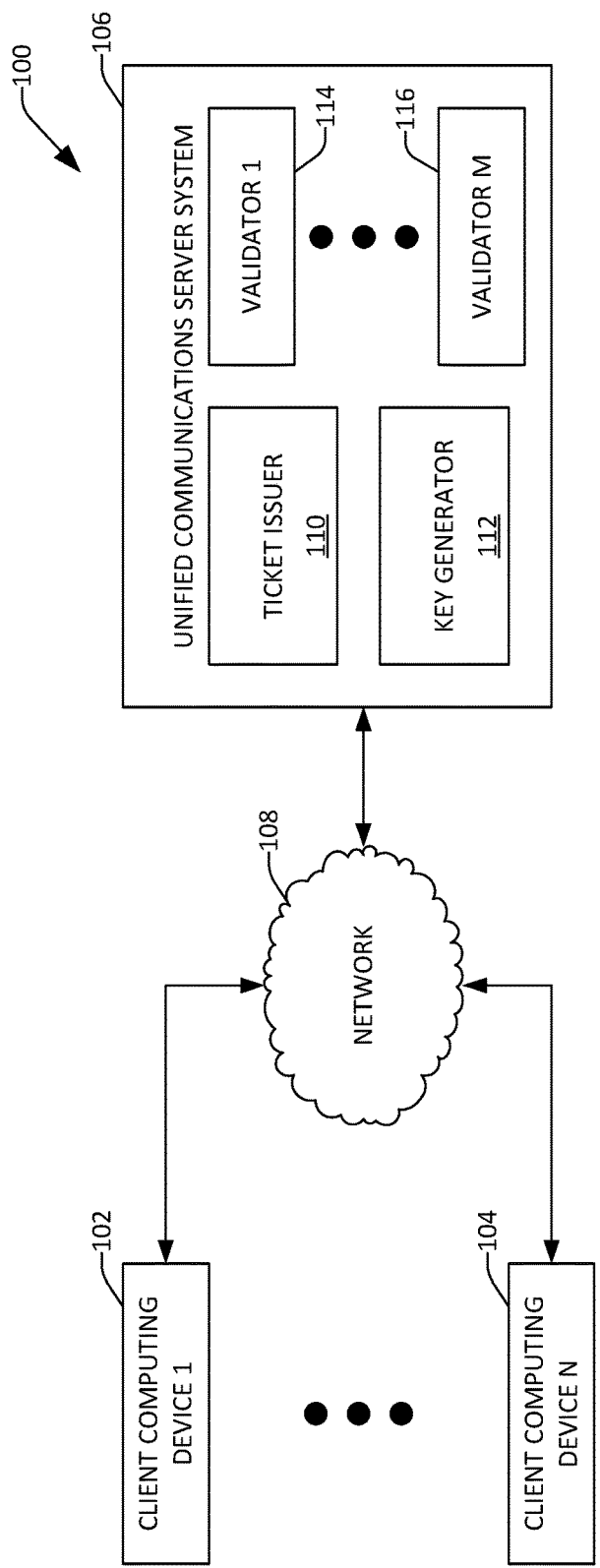
FIG. 1 is a functional block diagram of an exemplary system that facilitates generating web tickets for utilization in connection with authenticating a user to a server.

Various technologies pertaining to generation of a web ticket and use of the web ticket to authenticate a user to a server computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to the utilization of a web ticket to authenticate a user to a validating entity executing on a server computing device, wherein the web ticket includes a signature that is based upon a symmetric key. The symmetric key can be shared amongst servers that execute back-end software of an application to which the user desirably authenticates. To preserve security, the symmetric key is used in connection with generating web tickets for a relatively short amount of time, and thereafter a different symmetric key is used to generate web tickets. Accordingly, a web ticket generated for a first user at a first point in time may be based on a first symmetric key, while a web ticket for a second user generated at a second point in time may be based upon a second symmetric key. Utilization of symmetric keys to generate a web ticket allows for the payload of the web ticket to remain relatively small (e.g., 200 bytes or less). Accordingly, for instance, the web ticket can be readily appended to a uniform resource locator (URL) as a portion of a request, and the web ticket can be readily extracted from the URL in connection with authenticating the user.

With reference now to FIG. 1, an exemplary system 100 that facilitates the generation and use of web tickets in connection with authenticating users to server computing devices is illustrated. The system 100 is described in the context of a unified communications (UC) application. It is to be understood, however, that features described herein are not so limited. For example, features described herein are well-suited for any system to which a user desirably authenticates when the user is employing a mobile computing device. Furthermore, the features described herein may be well-suited for a system that includes multiple server computing devices that share symmetric keys therebetween.

The system 100 includes a plurality of client computing devices 102 through 104, wherein the client computing devices 102-104 can be or include at least one mobile computing device, such as a mobile telephone, tablet computing device, phablet computing device (e.g., a combination phone/tablet with a display screen of approximately 5 inches in diagonal), a portable media player, or the like. Additionally, the client computing devices 102-104 can include conventional desktop and/or laptop computing devices. Each client device in the client computing devices 102-104 can execute a respective client-side instance of the UC application. The UC application can support multiple modes of communications, including but not limited to voice communications, videoconferencing, instant messaging, presence, groups, screen sharing, voicemail, meeting organization, and the like.

The system 100 further comprises a UC server system 106, wherein the client computing devices 102-104 are in communication with the UC server system 106 (and with other client computing devices) by way of a network 108 (e.g. the Internet or an intranet). The UC server system 106 includes a plurality of server computing devices that respectively execute server-side instances (back-end software) of the UC application. The plurality of server computing devices can be in communication with one another by way of respective suitable communications channels.

The UC server system 106 includes a ticket issuer 110, a key generator 112, and a plurality of validators 114-116. The ticket issuer 110, key generator 112, and validators 114-116 are logical entities that execute on server computing devices in the UC server system 106. For example, the ticket issuer 110 may execute on a first server computing device while the key generator 112 may execute on a second server computing device. In another example, the ticket issuer 110 may execute in a distributed manner across a first plurality of server computing devices and the key generator 112 can execute in a distributed manner across a second plurality of server computing devices. In still yet another example, the ticket issuer 110 can execute on a first processor core or set of processor cores in a server computing device while the key generator 112 may execute on a second processor core or set of processor cores in the server computing device. Further, while the ticket issuer 110 and the key generator 112 are shown as being separate entities, in some embodiments, the ticket issuer 110 can be configured to perform functionality described herein as being performed by the key generator 112. Furthermore, it is to be understood that the UC server system 106 may include multiple ticket issuers and/or multiple key generators.

As indicated above, the system 100 facilitates generation and use of web tickets in connection with authenticating users to the validators 114-116 in the UC server system 106. To that end, in an example, the first client computing device 102 can execute a first client-side instance of the UC application and can transmit authentication data, such as a username and password, to the UC server system 106. The ticket issuer 110 can authenticate the user based upon the username and password, and can generate a web ticket for the user responsive to authenticating the authentication data provided by the first client computing device 102. The ticket issuer 110 can use a symmetric key to generate the web ticket. In an exemplary embodiment, the ticket issuer 110 can utilize a hash-based message authentication code (HMAC) protocol to create a signature based upon the symmetric key. Such signature, for example, can have a size of 32 bytes or 64 bytes. Additionally, the ticket issuer 110 can generate the web ticket such that the ticket includes multiple fields, wherein the fields include an identifier for the ticket issuer 110, a key identifier that identifies the symmetric key used to generate the web ticket, the signature, a time that the web ticket is to expire (e.g., the web ticket is valid only until the time indicated in the web ticket), at least one identifier for the user of the first client computing device 102, amongst other data. In an exemplary embodiment, the web ticket can be set to expire after a time window of more than one hour but less than one day (e.g., eight hours) has passed. The ticket issuer 110 may then transmit the web ticket by way of the network 108 to the first client computing device 102.

Subsequent to receiving the web ticket, the first client computing device 102 can transmit a request to the UC server system 106 for communications data for a communications modality desirably utilized at the first client computing device 102. For instance, the first client computing device 102 can transmit a request for a list of contacts of the user of the first client computing device 102. In an exemplary embodiment, such request can be in the form of an HTTP Uniform Resource Locator (URL) that is directed towards a particular server computing device in the UC server system 106 that can respond to the request. For instance, the URL can identify a server computing device that executes the first validator 114. Additionally, the web ticket is included in the request. Continuing with this example, the first validator 114 can receive the request and can analyze content of the web ticket to validate the web ticket, and thus authenticate the user. Specifically, the first validator 114 can read the data that identifies the ticket issuer 110 and the key identifier from the web ticket.

If the first validator 114 does not have access to an unexpired list of valid symmetric keys used by the ticket issuer 110 to generate web tickets, the first validator 114 can direct a request to the ticket issuer 110 for the list of symmetric keys, wherein symmetric keys in the list correspond to a time period in which the web ticket is valid. In an example, the web ticket may be valid for an 8-hour time window (e.g., eight hours after being generated by the ticket issuer 110). Further, the ticket issuer 110 may only use a symmetric key to generate web tickets for a smaller time window (e.g., one hour). Therefore, the collection of keys maintained by the ticket issuer 110 can be at least 9 keys (e.g., a symmetric key currently being used by the ticket issuer 110 and eight symmetric keys used by the ticket issuer 110 during the previous eight hours). The first validator 114 can use the key identifier in the web ticket to identify the key in the list of symmetric keys used by the ticket issuer 110 to generate the web ticket. The first validator 114 can then validate the web ticket using the symmetric key, and therefore may authenticate the user. Thereafter, the first validator 114 can generate a response to the request and transmit such response to the first client computing device 102. In this example, the first validator 114 can transmit the list of contacts to the first client computing device 102 responsive authenticating the user through use of the web ticket.

As size of the web ticket is relatively small (e.g., less than 200 bytes), a client computing device executing a client-side instance of the UC application can be configured to transmit a web ticket with each request made to a server in the UC server system 106. Once the web ticket has expired, the first client computing device 102 can request a new web ticket from the ticket issuer 110. Utilization of the web ticket in this manner also facilitates scaling of the UC server system 106 to allow more client computing devices to utilize services offered by the UC server system 106, as the UC server system 106 need not maintain a session identifier for each session in which the client computing devices 102-104 are participating with the UC server system 106. This is because the data included in the web ticket facilitates reconstitution of a session relatively quickly when a client computing device transmits a request to the UC server system 106. For instance, in addition to the information in the web ticket described above, the ticket issuer 110 can also include an identifier for a server computing device where traffic associated with the web ticket is to be terminated, an identifier for a session, etc.

Figure 2:
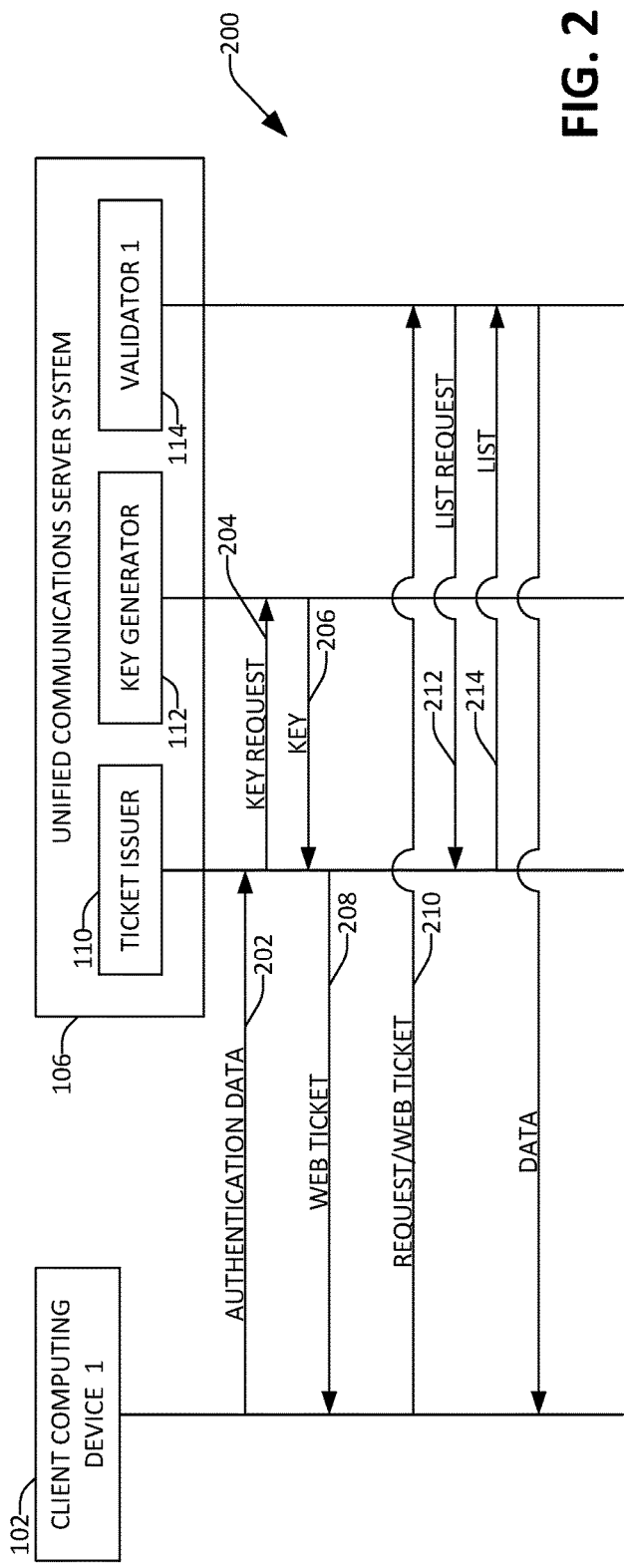
FIG. 2 is a communications diagram illustrating communications undertaken between a client and logical entities of a unified communication system in connection with authenticating the client to a validator.

Turning now to FIG. 2, an exemplary communications diagram 200 illustrating communications that can be undertaken between the first client computing device 102, the ticket issuer 110, the key generator 112, and the first validator 114 is illustrated. At 202, the first client computing device 102 transmits authentication data to the ticket issuer 110, wherein the authentication data may be a username and password or some other suitable data that can be used to identify the user of the first client computing device 102. The ticket issuer 110 may then authenticate the user based upon the authentication data received from the first client computing device 102. Responsive to authenticating the user, the ticket issuer 110 can commence with generating a web ticket.

As noted above, the ticket issuer 110 is configured to generate the web ticket through utilization of a symmetric key. To reduce security deficiencies corresponding to symmetric key encryption schemes, the ticket issuer 110 can use any one key to generate web tickets for a relatively small window of time (e.g., one hour). Thus, if the window of time is one hour, the ticket issuer 110 uses a different symmetric key each hour to generate web tickets. It is to be understood, however, that it may be desirable to cause the web ticket to be valid for a longer period of time than the window of time that the ticket issuer 110 uses symmetric keys to generate web tickets. Therefore, the ticket issuer 110 can maintain a collection (list) of symmetric keys corresponding to valid web tickets, discarding older keys as they become stale and replacing them with newer keys used by the ticket issuer 110 to create web tickets.

Accordingly, responsive to authenticating the user based upon the authentication data transmitted to the ticket issuer 110 at 202, the ticket issuer 110 can ascertain if it has access to a symmetric key that remains valid for generating web tickets (e.g., has not been used to generate web tickets for longer than one hour). If the ticket issuer 110 does not have access to a key suitable for generating the web ticket, then at 204 the ticket issuer 110 transmits a request for a key to the key generator 112. The key generator 112 utilizes a random number generator or pseudo-random number generator to generate at least one key, and at 206 provides the at least one key to the ticket issuer 110. If the request for the key is a first request for a key from the ticket issuer 110, then the key generator 112 can be configured to transmit multiple keys to the ticket issuer 110 at 206 (e.g., a first key for the ticket issuer 110 to utilize immediately, and one or more keys to utilize subsequent to the first key expiring).

If the ticket issuer 110 has access to a valid symmetric key or responsive to receiving the symmetric key from the key generator 112, at 208 the ticket issuer 110 can generate the web ticket and transmit the web ticket to the first client computing device 102. Thereafter, the first client computing device 102 may generate a request for communications data that supports a communications modality desirably undertaken at the first client computing device 102 (wherein the communications data is accessible to the first validator 114). The first client computing device 102 includes the web ticket in the request, and at 210 transmits the request to the first validator 114. To validate the web ticket, the first validator 114 needs knowledge of the symmetric key used by the ticket issuer 110 to generate the web ticket. Accordingly, the first validator 114 can analyze the web ticket received from the first client computing device 102 and identifies the ticket issuer 110 based upon content of the web ticket. The first validator 114 can locally search to ascertain if it already has access to a valid list of symmetric keys used by the ticket issuer 110 to generate web tickers. If the first validator 114 does not have access to such list, then at 212, the first validator transmits a request to the ticket issuer 110 for the list of symmetric keys maintained by the ticket issuer 110. For example, if the web ticket is valid for eight hours and the ticket issuer 110 uses a symmetric key for only one hour when generating web tickets, then the key collection maintained by the ticket issuer 110 can include at least nine keys.

At 214, the ticket issuer 110 transmits the list of keys to the first validator 114. The first validator 114 may then identify the key used by the ticker issuer 110 to generate the web ticket based upon the key identifier in the web ticket. Using such key, the first validator 114 can validate the web ticket, and thereby authenticate the user. Responsive to validating the web ticket, at 216 the first validator 114 can transmit a response to the first client computing device 102, wherein the response includes the communications data requested by the first client computing device 102.

Figure 3:
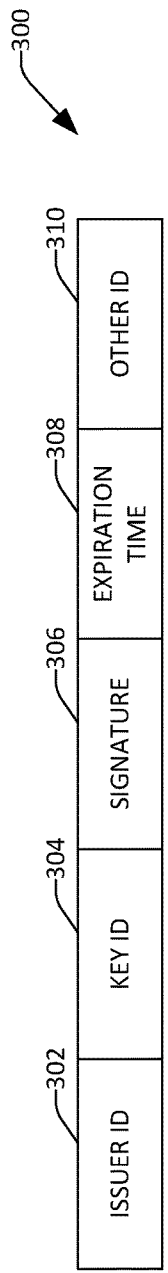
FIG. 3 illustrates an exemplary web ticket.

Now referring to FIG. 3, an exemplary web ticket 300 is illustrated. The web ticket 300 includes a first field 302 that comprises an issuer identifier that identifies a ticket issuer that generated the web ticket 300. The web ticket 300 further includes a second field 304 that comprises a key identifier that identifies a symmetric key utilized to generate the web ticket 300 by the ticket issuer identified in the first field 302. To be clear, the key identifier in the second field 304 is not the symmetric key itself; rather the key identifier is a value that can be used to look up the symmetric key in a database. The web ticket 300 also comprises a third field 306 that includes a signature that is generated based upon the symmetric key identified in the second field 304. A fourth field 308 of the web ticket 300 identifies a time that the web ticket 300 is to expire. For instance, the ticket issuer identified in the first field 302 can set the expiration time identified in the fourth field 308 as being some threshold amount of time after the ticket issuer generated the web ticket 300 (e.g., eight hours from the time that the ticket issuer generated the web ticket). The web ticket 300 also includes a fifth field 310 that can comprise some other identifier, such as an identifier of an organizer of a conference in which the user is going to participate, a user identifier, a session identifier, etc.

Figure 4:
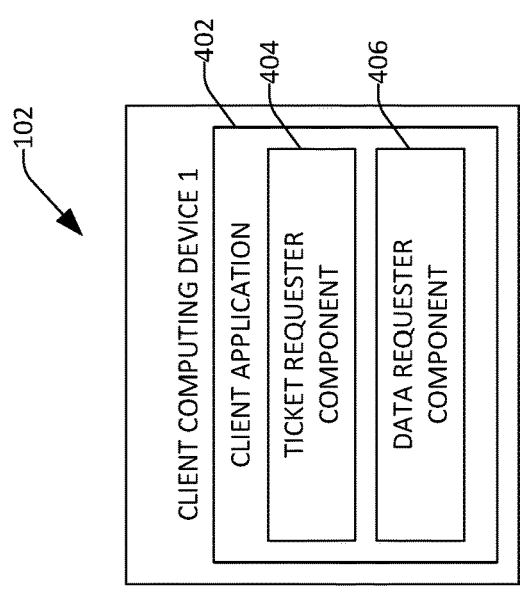
FIG. 4 is a functional block diagram of an exemplary client computing device that is configured to authenticate to a server through use of a web ticket.

Now referring to FIG. 4, an exemplary depiction of the first client computing device 102 is illustrated. The first client computing 102 executes a client-side instance of an application 402 (e.g., a UC application). The application 402 includes a ticket requester component 404 that is configured to request a web ticket from a ticket issuer. In an exemplary embodiment, the ticket requester component 404 can request the web ticket by transmitting a username and password to the ticket issuer. The client application 402 also includes a data requester component 406 that transmits a request for communications data to a validator, wherein the request includes the web ticket. Responsive to receiving a response to the request transmitted by the data requester component 406, the client application 402 can be configured to update graphical content displayed on a display screen of the first client computing device 102. In an example, the data requester component 406 can transmit a request for a contacts list of the user of the first client computing device 102. When a response to the request is received, the client application 402 can cause such contact list or a portion thereof to be displayed on the display screen of the first client computing device 102.

Figure 5:
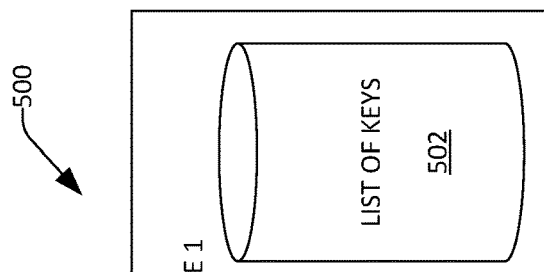
FIG. 5 is a functional block diagram of an exemplary server computing device that comprises a ticket issuer that is configured to generate a web ticket for a requesting client computing device.

Now referring to FIG. 5, an exemplary first server computing device 500 that can be included in the UC server system 106 is illustrated. The first server computing device 500 executes the ticket issuer 110. The first server computing device 500 also includes a data repository 502 that comprises a list of symmetric keys, wherein keys in the list of symmetric keys are associated with valid (unexpired) web tickets. As noted above, the ticket issuer 110 receives a request for a web ticket from a client computing device. The ticket issuer 110 accesses the data repository 502 to ascertain if a most recent key in the list of keys can be used to generate a web ticket for the requesting client computing device. If the list of keys does not include a suitable symmetric key, then a key requester component 504 can request a symmetric key from a key generator executing on a different server in the UC server system 106. In another embodiment, the ticket issuer 110 can be configured with a key generator, and can cause the key generator to generate the symmetric key.

If the list of symmetric keys includes a suitable symmetric key, or responsive to receiving a new symmetric key from the key generator, a ticket generator component 506 can generate a web ticket for the client computing device that issued the request. The ticket issuer 110 also includes a ticket transmitter component 508 that transmits the web ticket to the requesting client computing device.

The ticket issuer 110 is also charged with maintaining the list of symmetric keys in the data repository 502. That is, the ticket issuer 110 is configured to remove a symmetric key from the list of symmetric keys after a threshold amount of time has passed from the key becoming usable by the ticket issuer 110 to generate a web ticket. Therefore, for instance, eight hours after a key has been first used by the ticket issuer 110 to generate a web ticket, the ticket issuer 110 can remove such key from the list of symmetric keys. Likewise, the ticket issuer 110 can add a key to the list of keys when the key is received from the key generator 112. Accordingly, as a new key is added to the list of keys, an oldest key can be removed from such list.

Figure 6:
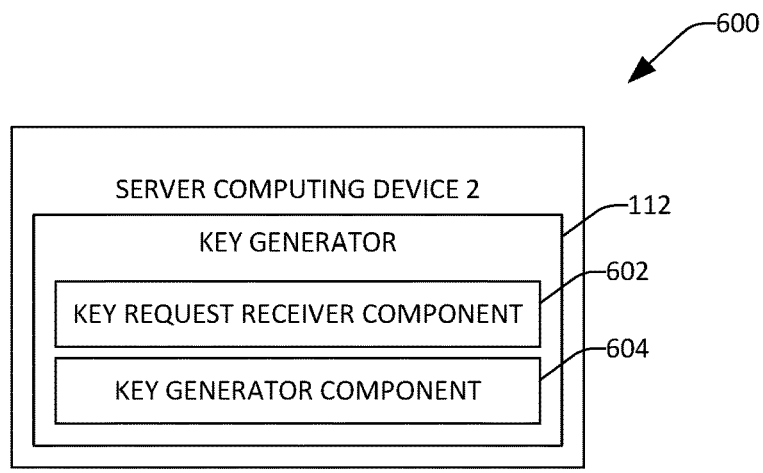
FIG. 6 is a functional block diagram of an exemplary server computing device that is configured to generate a symmetric key for use in connection with generating web tickets.

Now referring to FIG. 6, a second server computing device 600 in the UC server system 106 is illustrated. The second server computing device 600 can be in communication with the first server computing device 500 and can execute the key generator 112. The key generator 112 includes a key request receiver component 602 that receives a request from the ticket issuer 110 for a new symmetric key. A key generator component 604 generates the symmetric key responsive to the key request receiver component 602 receiving the request, and transmits the symmetric key to the requesting ticket issuer. Further, the key generator component 604 can generate a key identifier that can be used to identify the key in a lookup table, and the key generator component 604 can additionally transmit the key identifier to the requesting ticket issuer. Alternatively, the ticket issuer can generate the key identifier. Further, it is to be understood that the key generator 112 can generate keys for more than one ticket issuer.

Figure 7:
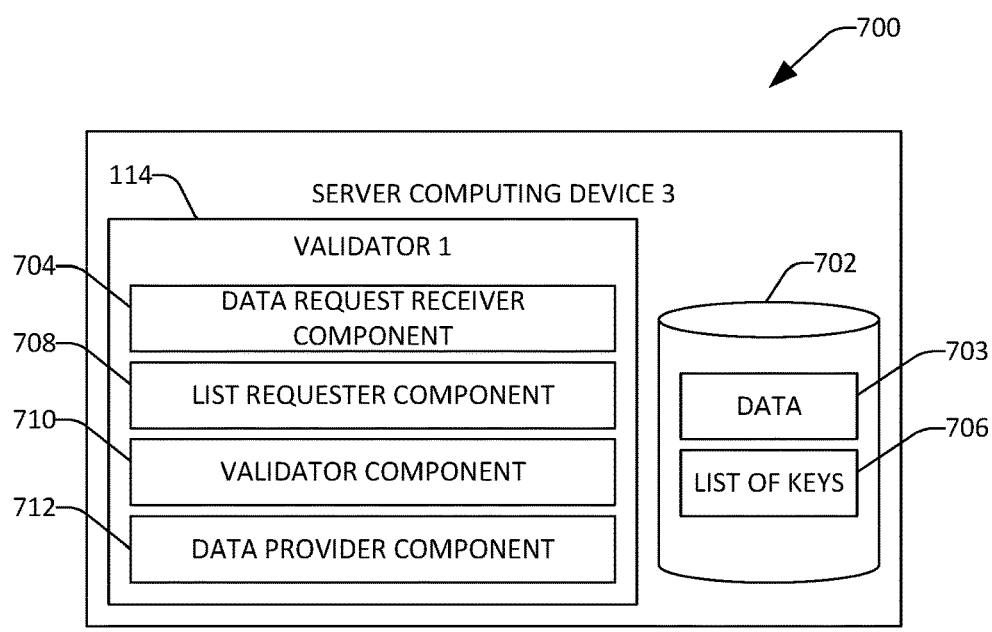
FIG. 7 is a functional block diagram of an exemplary server computing device that is configured to validate a web ticket provided by a client computing device.

Now referring to FIG. 7, a third server computing device 700 in the UC server system 106 is illustrated, wherein the third server computing device 700 executes the first validator 114. The third server computing device 700 includes a data repository 702, wherein the data repository 702 comprises communications data 703. The first validator 114 includes a data request receiver component 704 that receives a request for the communications data 703 from a client computing device, wherein the request includes a web ticket issued by the ticket issuer 110. The data repository 702 may also include a list of keys 706, wherein the list of keys 706 is a list of symmetric keys received previously from the ticket issuer 110. The first validator 114 can include a list requester component 708 that accesses the data repository 702 and reviews the list of keys 706 to ascertain if the list of keys 706 is current. If the list of keys 706 in the data repository 702 is not current, then the collection requester component 708 can request a list of keys from the ticket issuer 110 (as identified in the received web ticket). Such list of keys may be retained in the data repository 702 as the list of keys 706.

The validator 114 also includes a validator component 710 that can validate the web ticket, and thus authenticate the user of the requesting client computing device. For instance, the validator component 710 can review the web ticket to ascertain a field therein is missing. If the validator component 720 determines that a field is missing (e.g., any field in the web ticket), then the validator component 720 can reject the request for the data 703. Further, the validator component 710 can analyze the field in the web ticket that identifies when the web ticket expires. If the validator component 720 determines that the web ticket has expired, the validator component 710 rejects the request for the communications data 703. If the web ticket has not expired, the validator component 710 can extract the signature from the web ticket and can validate the signature using a symmetric key from the list of keys 706 identified in the web ticket. The first validator 114 further comprises a data provider component 712 that is in communication with the validator component 710. If the validator component 710 finds that the web ticket is valid, the data provider component 712 can cause the requested communications data 703 to be transmitted to the requesting client computing device. If the validator component 710 finds that the signature is invalid, then the request from the client is rejected.

FIGS. 8-11 illustrate exemplary methodologies relating to creation and use of web tickets to authenticate a user. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
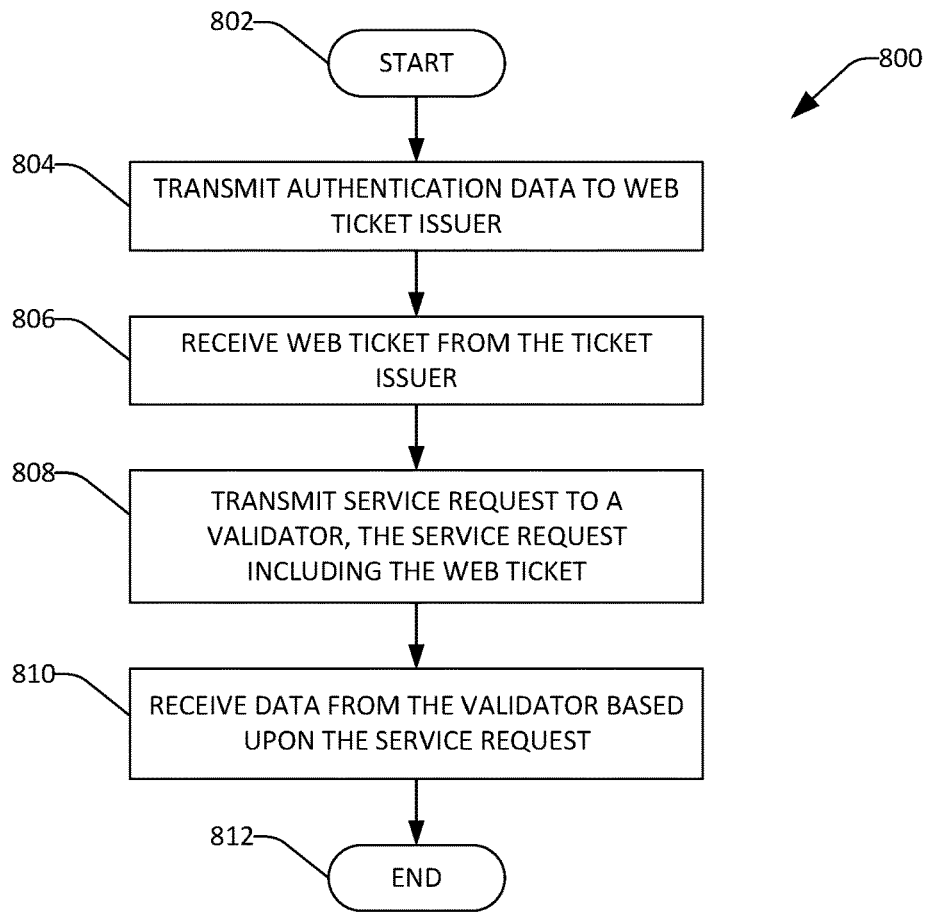
FIG. 8 is a flow diagram that illustrates an exemplary methodology executed by a client computing device in connection with authenticating a user to a server computing device through use of a web ticket.

With reference now FIG. 8, an exemplary methodology 800 that can be executed by a client computing device for receiving and using a web ticket in connection with authenticating a user is illustrated. The methodology 800 starts at 802, and at 804 authentication data is transmitted to a web ticket issuer. At 806, the client receives the web ticket from the web ticket issuer responsive to the web ticket issuer authenticating the authentication data transmitted at 804.

At 808, a data request is transmitted to a validator, wherein the data request includes the web ticket received at 806. At 810, responsive to the validator validating the web ticket, the requested data from the validator is received at 810. The methodology 800 completes at 812.

Figure 9:
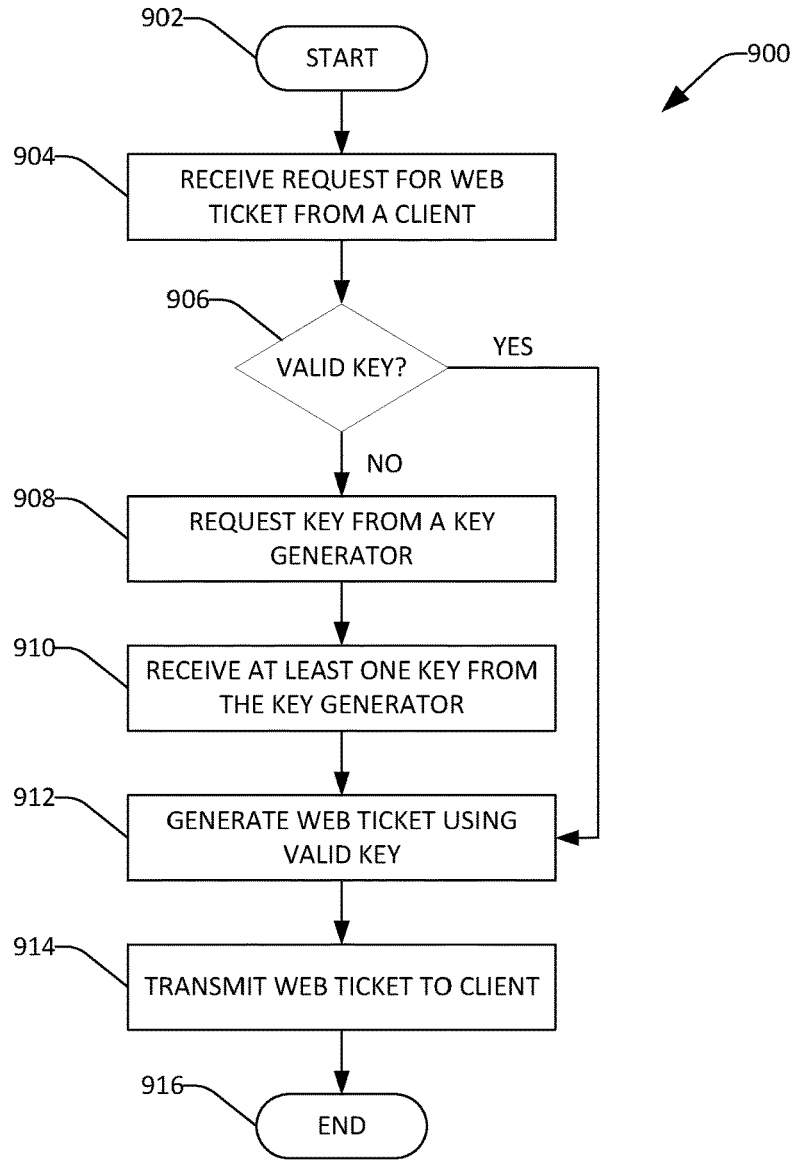
FIG. 9 is a flow diagram that illustrates an exemplary methodology executed by a ticket issuer in connection with generating a web ticket.

Now referring to FIG. 9, an exemplary methodology 900 that can be executed by a ticket issuer in connection with generating a web ticket is illustrated. The methodology 900 starts at 902, and at 904 a request for a web ticket is received from a client computing device. At 906, the ticket issuer analyzes a maintained list of symmetric keys to ascertain if the list of keys includes a symmetric key that is employable to generate a web ticket (e.g., the symmetric key has not expired). If the web ticket issuer does not have an unexpired symmetric key for generating a web ticket, then at 908 the web ticket issuer can transmit a request for a symmetric key to a key generator. Alternatively, if configured to do so, the ticket issuer can generate the symmetric key. At 910, responsive to transmitting the request to the key generator, at least one key can be received from the key generator. In some instances, the key generator can transmit multiple keys (e.g., three keys) to the web ticket issuer, wherein a first key is to be immediately used by the ticket issuer to generate web tickets, while the second and third keys are to be used subsequently to generate web tickets. For instance, the first key can be used to generate web tickets during hour one, the second key can be used to generate web tickets during hour two, and the third key can be used to generate web tickets during hour three. Accordingly, the ticket issuer is provided with a queue of symmetric keys and can provide requesting validators with such queue.

At 912, responsive to receiving the at least one key from the key generator at 910, or responsive to determining that the ticket issuer already has access to a valid key, at 912 the web ticket requested by the client computing device is generated. At 914, the web ticket is transmitted to the client computing device, and the methodology 900 completes at 916.

Figure 10:
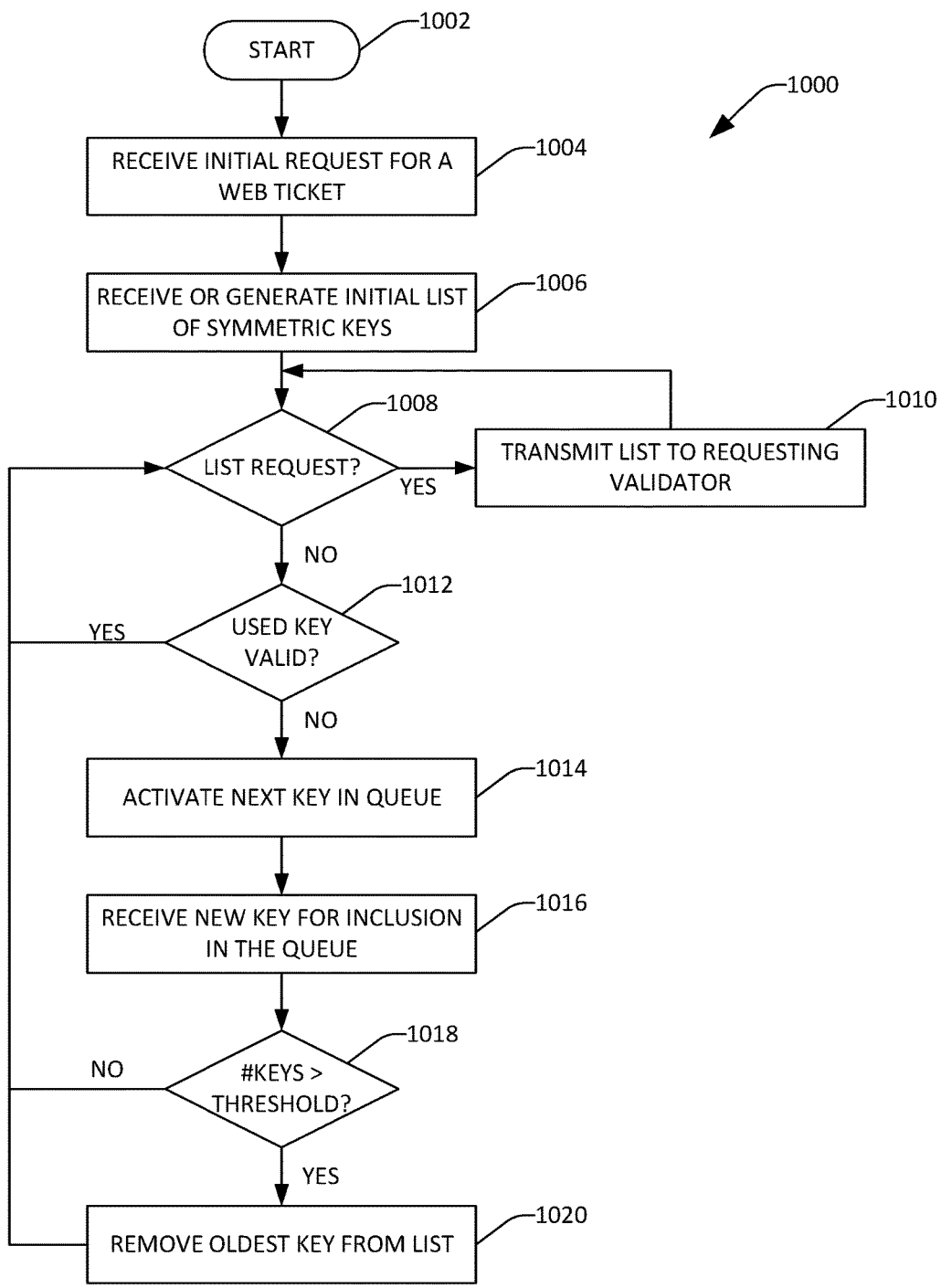
FIG. 10 is a flow diagram that illustrates an exemplary methodology executed by a key generator that facilitates generation of keys used to create web tickets.

With reference now to FIG. 10, an exemplary methodology 1000 that can be executed by a ticket issuer in connection with maintaining a list of keys and providing the list of keys to a requesting validator is illustrated. The methodology 1000 starts 1002, and at 1004, an initial request for a web ticket is received from a client computing device. At 1006, an initial list of symmetric keys is received or generated. The initial list of symmetric keys, in an exemplary embodiment, can include a plurality of keys: a first key that is to be immediately used by the ticket issuer to generate web tickets; a second key that is to be used to generate web tickets immediately after the first key expiring, and a third key that is to be used to generate web tickets immediately after the second key expiring. Thus, the list includes a queue of two keys that have yet to be employed by the ticket issuer to generate web tickets.

At 1008, a determination is made regarding whether a validator has requested the list of symmetric keys. If a request has been received from the validator, then the list of symmetric keys maintained by the ticket issuer is transmitted to the requesting validator at 1010, and thereafter the methodology 1000 returns to act 1008. It can be ascertained that the list includes two symmetric keys that have yet to be used by the ticket issuer. Inclusion of such keys can allow the requesting validator to use the list at future times without having to request an updated list from the ticket issuer. Furthermore, inclusion of such keys can take into consideration differences in clocks used by server computing devices.

At 1012, a determination is made regarding whether a most recent key used by the ticket issuer to generate web tickets remains valid. In other words, a determination is made if a threshold window of time within which the key can be used to generate web tickets has expired. If it is found that the key remains valid, then the methodology 1000 can return to act 1008.

If it is determined at 1012 that the key is no longer valid for use in connection with generating web tickets, then at 1014 the next key in queue in the list of symmetric keys is activated for use by the ticket issuer to generate web tickets. At 1016, a new key is received or generated for inclusion in the queue, such that the queue again includes two symmetric keys.

At 1018, a determination is made regarding whether the number of keys in the list of symmetric keys (after adding the new key to the queue) is greater than a predefined threshold. In other words, a determination is made regarding whether the oldest key in the list is associated with any valid web tickets. If it is determined that the number of keys in the list of keys is greater than the threshold, then at 1020 the oldest key is removed from the list. When it is determined at 1018 that the number of keys is not greater than the threshold, or subsequent to removing the oldest key from the list of keys, the methodology 1000 returns to act 1008.

If At 1006, a determination is made regarding whether the ticket issuer has a key collection retained or accessible thereto. If it is determined at 1006 that the ticket issuer does not include or have access to a key collection (e.g., this is the first request for a web ticket since a server executing the ticket issuer has been started), then at 1008, three symmetric keys can be generated. At 1010, respective expiration times can be assigned to the three keys. For instance, each key may be used by the ticket issuer for some period of time and the expiration times can include non-overlapping time ranges that are sequential.

Figure 11:
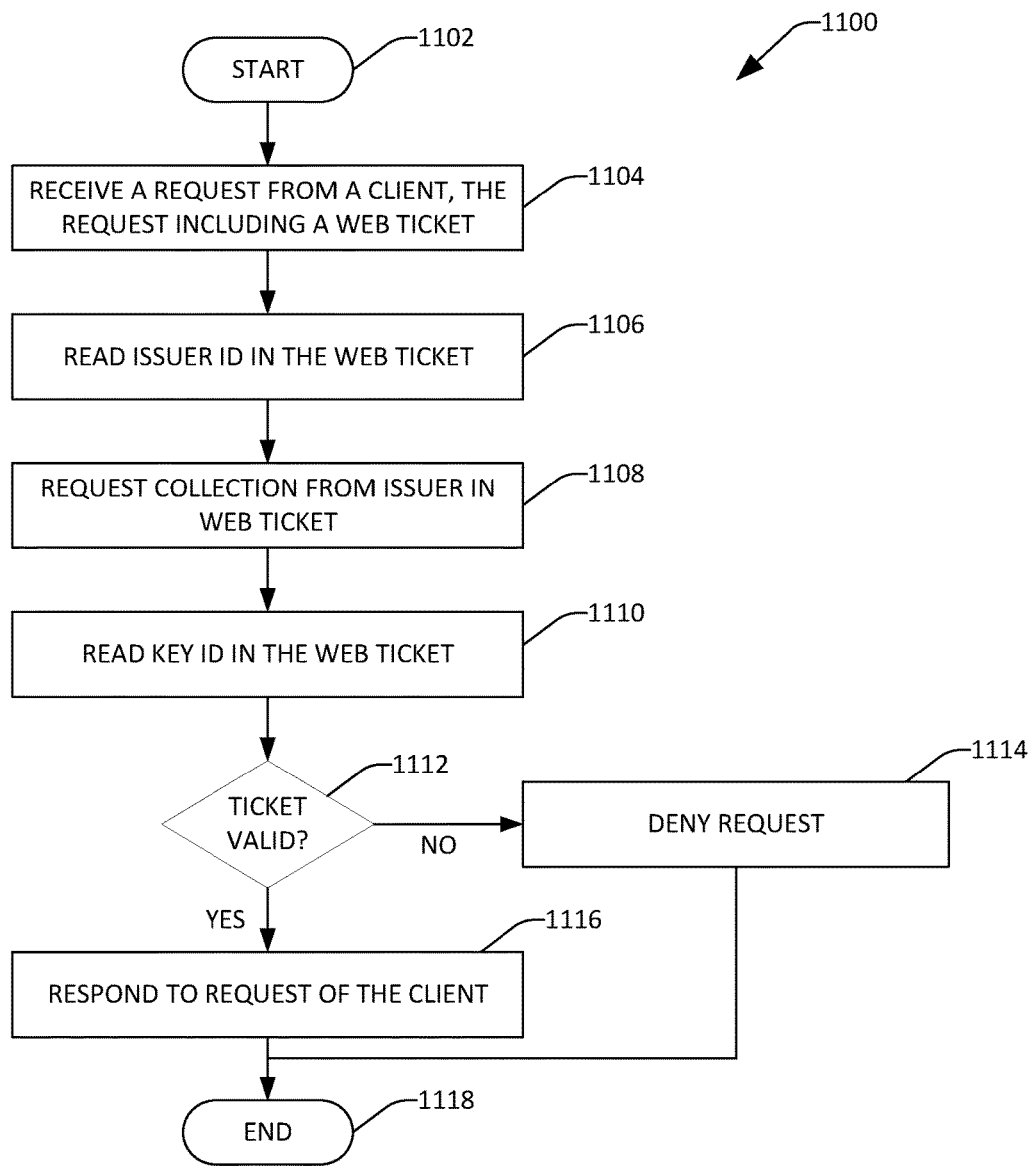
FIG. 11 is a flow diagram that illustrates an exemplary methodology executed by a validator that facilitates authenticating a user based upon a web ticket.

Now referring to FIG. 11, an exemplary methodology 1100 that can be executed by a validator in connection with validating a web ticket, and thereby authenticating a user, is illustrated. The methodology 1100 starts 1102, and at 1104, a request is received from a client computing device for communications data, wherein the request includes a web ticket. At 1106, an issuer identifier is read from the web ticket, and at 1108, a list of symmetric keys is requested from the ticket issuer identified in the web ticket. It is to be understood that in some cases, the validator will already have a valid list of symmetric keys in its cache, such that act 1108 is optional.

At 1110, a key identifier is read from the web ticket. At 1112, a determination is made regarding whether the web ticket is valid based upon content of the web ticket and/or the key. For instance, at 1112 a determination as to whether the web ticket has expired can be ascertained. Further, the signature can be extracted from the web ticket and validated based upon the key identified in the web ticket. If it is determined at 1112 that the web ticket is not valid, than at 1114 the request from the client is denied. If it is determined that 1112 that the web ticket is valid, then at 1116, a response to the request of the client is transmitted to the client, wherein the response includes the requested data. The methodology completes at 1118.

Figure 12:
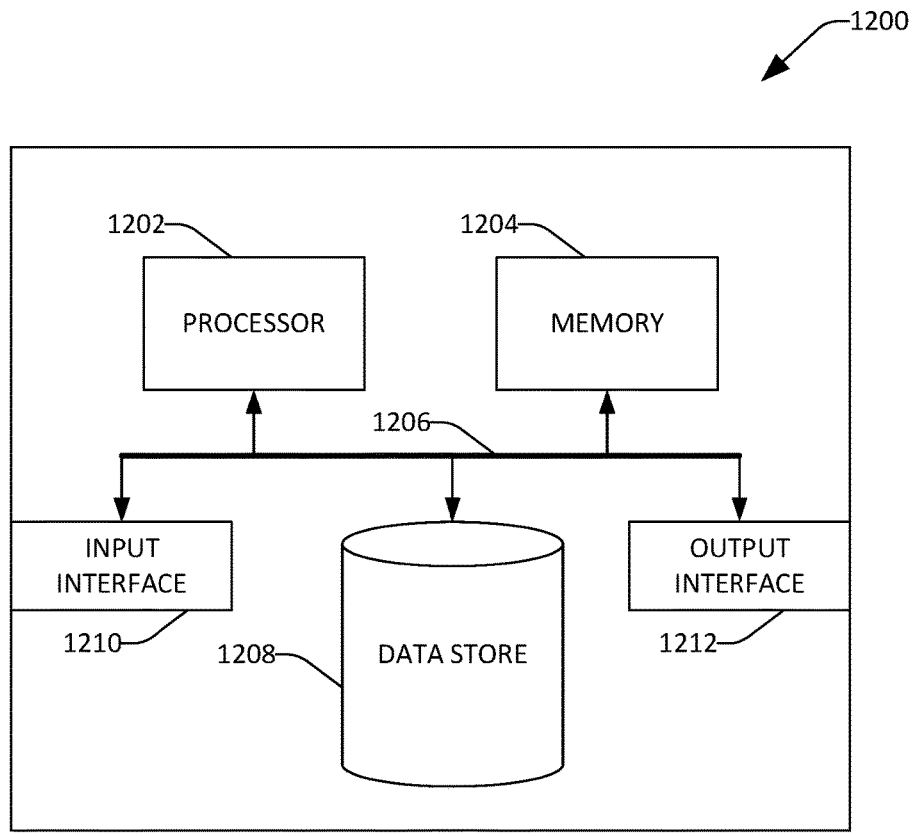
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that supports generation of a web ticket based upon a symmetric key. By way of another example, the computing device 1200 can be used in a system that supports maintaining a list of symmetric keys. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store a list of symmetric keys, communications data, web tickets, etc.

The computing device 1200 additionally includes a data store 1208 that is accessible by the processor 1202 by way of the system bus 1206. The data store 1208 may include executable instructions, a list of symmetric keys, web tickets, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   at least one processor; and
   memory storing instructions that, when executed by the at least one processor, cause the at least one processor to perform acts comprising:
   generating a first symmetric key and storing the first symmetric key in computer-readable storage, the first symmetric key has a first expiration time assigned thereto;
   responsive to receiving a request for a first web ticket from a first computing device that is in communication with the computing system, generating the first web ticket based upon the first symmetric key wherein the first web ticket has a second expiration time assigned thereto that is subsequent the first expiration time;
   responsive to receiving the request for the first web ticket, transmitting the first web ticket to the first computing device, wherein the first web ticket is valid for authenticating the first computing device until the second expiration time has passed, and further wherein the first computing device is authenticated subsequent to the first expiration time based upon the first web ticket and the first symmetric key;
   generating a second symmetric key and storing the second symmetric key in the computer-readable storage, the second symmetric key has a third expiration time assigned thereto, the third expiration time is subsequent to the first expiration time and prior to the second expiration time;
   subsequent to the first expiration time, prior to the second expiration time, and responsive to receiving a second request for a second web ticket from a second computing device that is in communication with the computing system, generating the second web ticket based upon the second symmetric key, wherein the second web ticket has a fourth expiration time assigned thereto that is subsequent the second expiration time; and responsive to receiving the request for the second web ticket, transmitting the second web ticket to the second computing device, wherein the second web ticket is valid for authenticating the second computing device until the fourth expiration time has passed, and further wherein the second computing device is authenticated based upon the second web ticket and the second symmetric key.

2. The computing system of claim 1, the acts further comprising:

subsequent the first expiration time and prior to the second expiration time, receiving the first web ticket from the first computing device; and responsive to receiving the first web ticket, authenticating the first computing device based upon the first web ticket and the first symmetric key.

3. The computing system of claim 1, the acts further comprising:

prior to the first expiration time, receiving the first web ticket from the first computing device; and responsive to receiving the first web ticket, authenticating the first computing device based upon the first web ticket and the first symmetric key.

4. The computing system of claim 1, the acts further comprising:

subsequent the second expiration time, receiving the first web ticket from the first computing device; and failing to authenticate the first computing device due to the first web ticket having expired.

5. The computing system of claim 1, the acts further comprising:

subsequent the first expiration time and prior to the third expiration time, receiving the second web ticket from the second computing device; and responsive to receiving the second web ticket, authenticating the second computing device based upon the second web ticket and the second symmetric key.

6. The computing system of claim 1, the acts further comprising:

subsequent the third expiration time and prior to the fourth expiration time, receiving the second web ticket from the second computing device; and responsive to receiving the second web ticket, authenticating the second computing device based upon the second web ticket and the second symmetric key.

7. The computing system of claim 1, the acts further comprising:

subsequent the fourth expiration time, receiving the second web ticket from the second computing device; and failing to authenticate the second computing device due to the second web ticket having expired.

8. The computing system of claim 1, wherein the first web ticket comprises a first signature and the second web ticket comprises a second signature, wherein the first signature is based upon the first symmetric key, and further wherein the second signature is based upon the second symmetric key.

9. The computing system of claim 8, wherein the first web ticket further comprises a first identifier that identifies the first symmetric key, and further wherein the second web ticket further comprises a second identifier that identifies the second symmetric key.

10. The computing system of claim 1, wherein both the first web ticket and the second web ticket have a size of less than 200 bytes.

11. A method executed by a computing system, the method comprising:

generating and storing a first symmetric key in computer-readable storage;

assigning a first expiration time to the first symmetric key;

receiving, from a first computing device, a first request for a first web ticket, wherein the first computing device is to authenticate with the computing system based upon the first web ticket;

responsive to receiving the first request, generating the first web ticket based upon the first symmetric key, wherein the computing system is configured to use the first symmetric key to generate web tickets only until the first expiration time, the first web ticket is valid for authenticating the first computing device only until a second expiration time, and further wherein the second expiration time is subsequent the first expiration time;

transmitting the first web ticket to the first computing device, wherein subsequent to the first expiration time the computing system authenticates the first computing device based upon the first web ticket when the first computing device provides the computing system with the first web ticket;

generating and storing a second symmetric key in the computer-readable storage;

assigning a third expiration time to the second symmetric key, wherein the third expiration time is subsequent the first expiration time;

subsequent the first expiration time, receiving, from a second computing device, a second request for a second web ticket, wherein the second computing device is to authenticate with the computing system based upon the second web ticket;

responsive to receiving the second request, generating the second web ticket based upon a second symmetric key, wherein the computing system is configured to use the second symmetric key to generate web tickets only until the third expiration time, the second web ticket is valid for authenticating the second computing device only until a fourth expiration time, and further wherein the fourth expiration time is subsequent the second expiration time; and transmitting the second web ticket to the second computing device, wherein the computing system authenticates the second computing device based upon the second web ticket when the second computing device provides the computing system with the second web ticket.

12. The method of claim 11, wherein the third expiration time is prior to the second expiration time.

13. The method of claim 12, further comprising:

wherein the second symmetric key is generated and stored subsequent to the first expiration time and prior to the second expiration time.

14. The method of claim 12, wherein the first web ticket comprises a first identifier for the first symmetric key, the method further comprising:

receiving, from the first computing device, the first web ticket;

responsive to receiving the first web ticket, determining that the first identifier is included in a list of symmetric key identifiers, wherein the symmetric key identifiers identify valid symmetric keys that have not expired;

responsive to determining that the first identifier is included in the list of symmetric key identifiers, obtaining the first symmetric key from the computer-readable storage; and authenticating the first computing device based upon the first web ticket and the first symmetric key.

15. The method of claim 14, wherein the second web ticket comprises a second identifier for the second symmetric key, and further wherein the second identifier is included in the list of symmetric key identifiers.

16. The method of claim 15, further comprising:

receiving, from the second computing device, the second web ticket;

responsive to receiving the second web ticket, determining that the second identifier is included in the list of symmetric key identifiers;

responsive to determining that the second identifier is included in the list of symmetric key identifiers, obtaining the second symmetric key from the computer-readable storage; and authenticating the second computing device based upon the second web ticket and the second symmetric key.

17. The method of claim 14, further comprising:

removing the first identifier from the list of symmetric key identifiers at the second expiration time.

18. The method of claim 12, further comprising:

receiving a request to authenticate the first computing device, the request is in the form of a uniform resource locator (URL), wherein the URL comprises the web ticket.

19. A computer-readable storage medium comprising instructions that, when executed by a processor, cause the processor to perform acts comprising:

generating a first symmetric key and storing the first symmetric key in computer-readable storage, the first symmetric key has a first expiration time assigned thereto;

responsive to receiving a request for a first web ticket from a first computing device that is in communication with the computing system, generating the first web ticket based upon the first symmetric key, wherein the first web ticket has a second expiration time assigned thereto that is subsequent the first expiration time;

responsive to receiving the request for the first web ticket, transmitting the first web ticket to the first computing device, wherein the first web ticket is valid for authenticating the first computing device until the second expiration time has passed, and further wherein the first computing device is authenticated based upon the first web ticket and the first symmetric key;

generating a second symmetric key and storing the second symmetric key in the computer-readable storage, the second symmetric key has a third expiration time assigned thereto, the third expiration time is subsequent to the first expiration time and prior to the second expiration time;

subsequent to the first expiration time, prior to the second expiration time, and responsive to receiving a second request for a second web ticket from a second computing device that is in communication with the computing system, generating the second web ticket based upon the second symmetric key, wherein the second web ticket has a fourth expiration time assigned thereto that is subsequent the second expiration time; and responsive to receiving the request for the second web ticket, transmitting the second web ticket to the second computing device, wherein the second web ticket is valid for authenticating the second computing device until the fourth expiration time has passed, and further wherein the second computing device is authenticated based upon the second web ticket and the second symmetric key.

20. The computer-readable storage medium of claim 19, wherein both the first web ticket and the second web ticket have a size of less than 200 bytes.

* * * * *